United States Patent Office 3,102,028
Patented Aug. 27, 1963

---

3,102,028
PHOTOGRAPHIC ELEMENT HAVING A STRIPPING OR ANTIHALATION LAYER COMPRISING A RESINOUS CARBOXY ESTER-LACTONE
Louis M. Minsk, Rochester, N.Y., assignor to Eastman Kodak Company, Rochester, N.Y., a corporation of New Jersey
No Drawing. Filed Oct. 16, 1961, Ser. No. 145,436
2 Claims. (Cl. 96—83)

This invention relates to resinous carboxy ester-lactone polymers and to a process for preparing the same. More particularly the invention relates to resinous ester-lactones prepared from interpolymers of unsaturated $\alpha,\beta$-dicarboxylic acids or their anhydrides and vinyl organic acid esters.

This appliaction is a continuation-in-part of my copending application Serial No. 772,725, filed November 10, 1958 (now United States Patent No. 3,007,901, dated November 7, 1961).

The interpolymers ordinarily prepared by polymerizing a mixture of an unsaturated $\alpha,\beta$-dicarboxylic acid anhydride with a vinyl organic acid ester are well known. Thus, polymerization of a mixture of maleic anhydride and vinyl acetate yields an interpolymer I which can be represented graphically as follows:

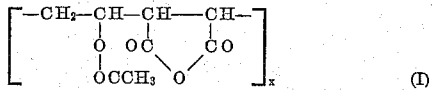

(I)

This interpolymer is brittle and insoluble in water but soluble in certain organic solvents such as acetone and pyridine. It can be saponified to give water soluble products or it can be hydrated with water to give a polymeric material II as follows:

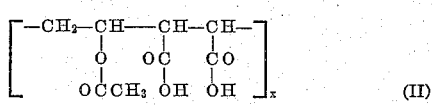

(II)

This hydrate II is in effect an interpolymer of vinyl acetate and maleic acid and is water soluble.

The interpolymers of this type have been modified by reacting them with a monohydric alcohol whereby the compound was de-acylated and esterified with the monohydric alcohol and simultaneously converted into a lactone. The resulting lactone esters are water insoluble, water intolerant and alkali insoluble, and find utility in applications where hydrophobic characteristics as well as film-forming properties are necessary. Such resinous ester-lactones and their preparation are described in McNally et al., U.S. Patent 2,306,071.

For some applications, however, such as for developer-removable backings or stripping layers for photographic film, it is desirable to have highly flexible materials which are water insoluble but which will dissolve in aqueous solutions of bases. In particular these materials should be soluble in bases as weak as sodium bicarbonate.

It is accordingly an object of this invention to provide a new class of modified polymers which are flexible film-forming materials soluble in weak basic solutions.

It is another object of this invention to provide an improved method for modifying the physical and chemical characteristics of interpolymers of unsaturated $\alpha,\beta$-dicarboxylic acids or their anhydrides and vinyl organic acid esters.

It is also an object of this invention to prepare new and improved film-forming materials which are suitable for use as photographic developer-removable backings or stripping layers or the like in photographic film.

Another object of the invention is to provide heteropolymers which have been modified by simultaneous reaction with a monohydric hydroxy acid and a monohydric alkanol.

Another object of the invention is to provide an effective method of forming a new class of mixed ester-lactone resins from vinyl acetate-maleic anhydride interpolymers.

Another object of the invention is to provide alkali-soluble, flexible mixed ester-lactone polymers by the reaction of monohydric hydroxy acid of the lactic acid series and a monohydric alkanol containing from 1–2 carbon atoms with an interpolymer of vinyl acetate and maleic anhydride.

These and other objects are attained in accordance with this invention which in general comprises heating to reacting temperature under acid conditions a heteropolymer of a vinyl or isopropenyl organic acid ester and an unsaturated $\alpha,\beta$-dicarboxylic acid with a mixture of a monohydric hydroxy acid and a monohydric alkanol. These new resins appear to be comprised essentially of substantial proportions of each of the following recurring structural units:

(1)

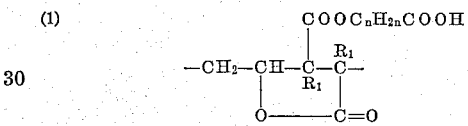

(2)

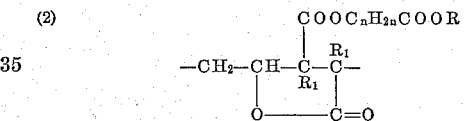

(3)

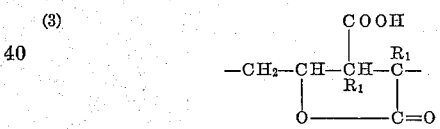

and (4)

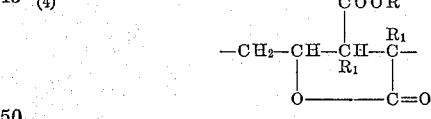

wherein $n$ represents an integer of from 1–5, R represents and alkyl group containing from 1–12 carbon atoms, e.g. methyl, ethyl, propyl, isopropyl, butyl, hexyl, decyl, dodecyl, etc. groups or a phenylalkyl group wherein the alkyl group contains from 1–4 carbon atoms e.g. benzyl, phenylethyl, phenylpropyl, phenylbutyl etc. groups or the corresponding tolylalkyl groups and $R_1$ represents a hydrogen atom or a methyl group, and thus can be defined as mixed alkyl esters and carboxy esters of a monohydric hydroxy acid and a monohydric alkanol of a lactone of an interpolymer of vinyl alcohol and an unsaturated $\alpha,\beta$-dicarboxylic acid. In usual practice, the interpolymer is prepared using the anhydride of such acid rather than the free dicarboxylic acid itself. In the specification and claims, it will be understood that references to the unsaturated $\alpha,\beta$-dicarboxylic acid are intended to include the corresponding anhydride, that the vinyl alcohol is not usually employed as such but the interpolymer is prepared from a vinyl organic acid ester and such is intended to be within the scope of the invention as described herein and defined in the appended claims.

When the interpolymers, such as I and II above, are reacted with a mixture of an aliphatic monohydric hydroxy acid and an alcohol of the formulas:

wherein $n$ and $R$ are as previously defined and $x$ is 1 or 2 in accordance with this invention, the heteropolymer is de-acylated and then esterified with the hydroxy acid and alcohol to form a mixed alkyl ester and carboxy ester and the acid or anhydride groups simultaneously undergo an inner condensation into a lactone grouping. The proportions of the reacting components can advantageously range about from 15–30 parts by weight of the intermediate heteropolymer which is preferably a vinyl acetate-maleic anhydride heteropolymer, from 35–65 parts by weight of the monohydric hydroxy acid and from 10–45 parts by weight of the monohydric alcohol, the total weight of these components equalling 100 parts by weight in each combination.

The exact proportions of structural units (1), (2), (3) and (4) are not accurately known but considerable variation is possible depending on the relative amounts of monohydric hydroxy acid and monohydric alkanol employed. According to the analytical data, the carboxy group content decreases as the amount of alcohol employed is increased. For example, the carboxy ester-lactones produced in accordance with the invention with glycol acid but with no alcohol present in the reaction mixture show a carboxyl content equivalent to 6.35 mls. of N NaOH solution/gram of resin, whereas on repeating this reaction with suitable amounts of alcohol present, for example, n-butyl alcohol, the carboxyl contents of the resulting modified products are in the range equivalent to about from 3.5 to slightly above 6.0 mls. of N NaOH solution/gram of product. However, those modified products in the range of carboxyl content equivalent to from 4.0 to 6.0 mls. of N NaOH solution/gram of product are preferred since they give the best adherence and least dye stain in photographic applications of the kind contemplated. The preferred resin products are all soluble in weak aqueous alkaline solutions, whereas the products outside the preferred range of equivalent carboxyl content tend to become insoluble below the lower limit of 3.5 or has greater tendency for dye stain above the upper limit of 6.0.

The new resins embodying this invention can be used to make flexible films or sheets, which, by virtue of their alkali-solubility, find application as film backing colloids, stripping layers or readily removable protective coatings for photographic or other materials. Since these materials are flexible, it is ordinarily not necessary to incorporate plasticizers into them, although plasticizing materials can be added as desired to modify the properties of these new resins still further. The resins embodying this invention can also be compounded by the addition of fillers, coloring materials such as pigments or dyes, and the like in accordance with well-known practices.

The new resins can be dissolved in well-known organic solvents and films or sheets are formed by casting the solution on a film-forming surface, such as a glass or metal plate or a smooth revolving drum, allowing it to dry in a film, and then stripping it from the surface. The drying may be facilitated by blowing warm air over the film or sheet and the stripped film or sheet can be cured by treating it with warm air. The resulting sheet material is clear and transparent. The resins can be coated onto a suitable support for use as a backing layer for photographic film or can be used as an interlayer between emulsion layers for stripping. In some cases they can actually act as a carrier for photo-sensitive materials such as silver halides or they can be used as support for light-sensitive photographic coatings. The film or sheet can be coated directly with photographic emulsions or can be coated first with resinous or other materials before application of the photographic emulsion.

The interpolymers employed as starting materials are those prepared from an unsaturated $\alpha,\beta$-dicarboxylic acid or its anhydride, such as maleic acid, citraconic acid, dimethylmaleic acid or anhydrides or alkyl esters of 1–4 carbons thereof, fumaric acid, mesaconic acid, dimethylfumaric acid or alkyl esters of 1–4 carbons thereof, or similar well-known dicarboxylic acid and a vinyl organic acid ester such as vinyl acetate, vinyl propionate, vinyl benzoate or the like. Such interpolymers are then converted to a mixed alkyl ester and carboxy ester lactone by heating at reaction temperature with a mixture comprising a monohydric hydroxy acid and monohydric alkanol as previously defined. The preferred acid is of the lactic acid series. Thus, suitable hydroxy acids include glycolic acid, lactic acid, hydroxybutyric acid, hydroxyvaleric acid and hydroxycaproic acid. Other monohydric hydroxy acids such as malic acid can also be employed. Suitable monohydric alkanols include methanol, ethanol, propanol, isopropanol, n-butanol, n-hexanol, 2-ethyl-1-hexanol, decanol, dodecanol, and the like. As previously mentioned, in the treatment of the initial interpolymer with the hydroxy acid and the alcohol, the acyl groups are removed. The carboxylic acid or anhydride groups are esterified with the hydroxy acid to give carboxy ester groups and with the alcohol to give alkyl ester groups and at the same time an inner condensation takes place to give lactone groups. The reaction embodying this invention is carried out in the presence of a strong acid such as a mineral acid catalyst having an acidity of the order of sulfuric acid. Thus, the acid employed can be sulfuric acid, hydrochloric acid, and the like.

The above reaction can be effected in a solvent medium using any of the well-known organic solvents which do not have a reacting group. Alternately, the reaction can be effected in a partially aqueous medium and this is particularly desirable although not necessary when treating an anhydride interpolymer. Also, the reaction temperature is not critical although elevated temperatures of the order of 60 to 100° C. are usually employed. Higher temperatures, of course, can be used, if desired, but are usually not necessary. In effecting the reaction, the hydroxy acid and alcohol are desirably employed in excess, for example, in at least 2 molar proportions for each molar proportion of the interpolymer. In some cases, it may be desirable to employ the hydroxy acid and alcohol in larger amounts of as much as 10 or even 25 molar proportions to each molar proportion of the interpolymer. In the production of these resins, the process can be carried out either batchwise or in continuous fashion in accordance with known chemical practice.

The invention is further illustrated by the following detailed examples of preferred embodiments thereof which are not intended to limit the scope of the invention unless otherwise specifically indicated.

EXAMPLE 1

The preparation of interpolymers of vinyl organic acid esters and unsaturated $\alpha,\beta$-dicarboxylic acids are well known in the art. A typical polymerization is illustrated in the preparation of a vinyl acetate-maleic anhydride interpolymer. Thus 500 g. of maleic anhydride and 500 cc. of vinyl acetate were mixed together and warmed at 60° C. until the anhydride had dissolved. Thereafter, 0.35 g. of benzoyl peroxide was added to the solution and the temperature was gradually raised to 80° C. over a period of about 2 hours. After the vigorous reaction had subsided, the reaction mixture was heated at 80° C. for an additional few minutes and then cooled and diluted with 3 liters of acetone. The interpolymer was precipitated out by pouring the acetone solution into cool water and the resulting white interpolymer was squeezed and dried in air. Other well known interpolymers of vinyl organic acid esters and unsaturated α,β-dicarboxylic acids can be prepared in a similar manner in accordance with well known practice and are suitable for use in practicing this invention.

EXAMPLE 2

A reaction mixture of 2480 ml. dry benzene, 220.5 g. maleic anhydride, 193.5 g. distilled vinyl acetate, and 4.25 g. benzoyl peroxide was heated at reflux for 2½ hours in an all glass outfit protected from moisture by a calcium chloride tube. The thick slurry obtained was cooled, diluted with an equal volume of dry benzene. The polymer was filtered on a Buchner funnel and washed on the funnel with dry benzene. It was dried in a vacuum desiccator under a constantly applied water pump vacuum, followed by several hours in a 110° C. oven in an open dish. The yield was 343 g. The inherent viscosity in acetone in a concentration of 0.25 g. per 100 cc. was 0.47.

A 100 g. portion of this vinyl acetate-maleic anhydride interpolymer was mixed with 600 cc. of 1,4-dioxane and 400 cc. of 85% lactic acid in an all-glass reflux apparatus. The resulting mixture was then stirred while 35 cc. of concentrated sulfuric acid was added and the reaction mixture was then heated on a steam bath for 19 hours. The viscous solution thus obtained was diluted with 2 liters of acetone and then poured in a fine stream into distilled water. The fibrous product was washed free of acid with distilled water, during which time it hardened. It was then dried under vacuum over calcium chloride and the dried product weighed 77 g. A 2 g. portion of this carboxy ester-lacetone was dispersed in 20 cc. of a mixture of 9 parts of acetone and 1 part of water. To the mixture was added 5 cc. of β-methoxy ethyl alcohol and a film was cast on a glass plate. After being cured in warm air, the film was clear and flexible and was soluble in aqueous sodium bicarbonate or sodium hydroxide but insoluble in water. This film made an excellent backing for photographic film and dissolved away readily in slightly basic developer solutions.

EXAMPLE 3

A mixture of 20 g. of vinyl acetate-maleic anhydride interpolymer, 120 cc. of 1,4-dioxane, 50 g. of crystalline glycolic acid, 10 cc. of distilled water and 7 cc. of concentrated sulfuric acid was heated on the steam bath for 21 hours. The reaction mixture was then diluted with acetone and the product was precipitated into water. After being dried, the product was a white fibrous material weighing 16.5 g. and this product was cast into a clear flexible film as described in the preceding example. It was water-insoluble, but soluble in weak solutions of alkaline material.

EXAMPLES 4–9

(4) In a 5-liter flask equipped with a reflux condenser and stirrer were placed 1390 mls. of dioxane, 940 mls. of 70% glycolic acid, 450 mls. of n-butyl alcohol and 300 g. of vinyl acetate-maleic anhydride heteropolymer $$(\{\eta\}=0.21)$$

The suspension was stirred until a smooth brown dope was obtained. To this was added 108 mls. of concentrated sulfuric acid dropwise. The slightly lighter colored dope was stirred and heated on a steam bath overnight, at the end of which time, it was cooled and diluted with acetone to precipitation viscosity. The light amber colored dope was poured into distilled water with stirring to obtain a soft and partially fibrous product. The polymer was stirred, with repeated changes of distilled water, until free from mineral acid. During this time it hardened and broke apart readily. It was dried in an air oven at room temperature to give 240 g. of a cream-colored product soluble in dilute base such as aqueous sodium carbonate. Direct titration in 1:1 acetone-water (200 ml./g.) with N/2 NaOH to a phenolphthalein endpoint indicated a carboxyl content equivalent to 4.84 mls. of N NaOH solution/gram of resin.

(5–9) The above procedure was repeated except that a number of other alcohols were substituted in place of the n-butyl alcohol. The variations and results obtained are set forth in the following table (Table I).

The resinous products prepared as above described were then dissolved in a suitable solvent and the respective solutions coated onto a cellulose acetate film support and tested for adherence of the coatings to the film base, removability of the coatings from the film base by aqueous alkaline solutions and dye stain remaining after alkaline processing such coated film base, the coating in this case having a basic dye incorporated therein. Good adherence, good removability and absence of dye stain are desired properties. The variations and results obtained are listed in the following table.

| Example No. | Alcohol | Amt., mls. | Yield, gms. | Carboxyl content mls. N NaOH/g | Coatings of product | | |
|---|---|---|---|---|---|---|---|
| | | | | | Adherence | Removability | Dye stain |
| 4 | n-Butanol | 450 | 240 | 4.84 | Good | Good | Very slight. |
| 5* | Ethanol | 450 | 215 | 4.85 | do | do | Do. |
| 6 | n-Hexanol | 450 | 248 | 5.07 | Fair-Good | do | Do. |
| 7 | 2-Ethyl-1-hexanol | 375 | 252 | 5.89 | do | do | Slight. |
| 8 | Benzyl alcohol | 300 | 240 | 5.55 | Fair | do | Do. |
| 9 | n-Decanol | 450 | 237 | 5.75 | | | |

*Analysis of this example for ethoxyl group gave a value of 8.25% of $C_2H_5O-$. This is equivalent to 15.8% by weight of ethyl maleate groupings in the resin molecule.

EXAMPLES 10–18

These examples illustrate the effect of variation in the amount of n-butyl alcohol used in the reaction mixture for preparing the modified carboxy ester-lactone resins of the invention.

In a 12 liter flask equipped with a reflux condenser, stirrer and dropping funnel were placed 1850 mls. of dioxane, 1250 mls. of glycolic acid, n-butyl alcohol in amount given in Table II, and 400 grams of vinyl acetate-maleic anhydride heteropolymer (Note 1) based on content of moist polymer. The suspension was stirred until a smooth dope was obtained. To this was added dropwise 145 mls. of concentrated sulfuric acid. The slightly lighter colored dope was stirred and heated on a steam bath overnight, at the end of which time, it was cooled and diluted with acetone to precipitation viscosity. The pale yellow colored dope was poured into distilled water with stirring to obtain a soft, fibrous, and light cream colored product. The polymer was stirred with repeated changes of distilled water, until free from mineral acid. It was dried in an air oven at room temperature to yield a fibrous light cream-colored product soluble in dilute base such as aqueous sodium carbonate or ordinary photographic developers. Direct titration in 1:1 acetone-water (200 ml./g.) with N/2 NaOH to a phenolphthalein endpoint was used to determine the carboxyl content.

The resulting products prepared as above described were dissolved in a suitable solvent, the solutions coated onto a cellulose acetate film support and then tested for adherence, removability and dye stain. The variations and results obtained are listed in the following table (Table II).

Table II

| Ex. No. | mls. butyl alcohol | Carboxyl content, mls. N NaOH/g. | Coatings of product |  |  |
|---|---|---|---|---|---|
|  |  |  | Adherence | Removability | Dye Stain |
| 10 | none | 6.35 | Fair | Good | Slight. |
| 11 | 200 | 5.84 | Fair–Good | do | Very Slight. |
| 12 | 400 | 5.39 | Good | | None. |
| 13 | 600 | 5.10 | do | Good | Very Slight. |
| 14 | (ᵃ) | 4.60 | do | do | Do. |
| 15 | 600 | 5.00 | do | do | Practically None. |
| 16 | 900 | 4.50 | do | do | Very Slight. |
| 17 | 1,200 | 4.14 | do | do | Do. |
| 18 | (ᵇ) 900 | 3.75 | do | Flakes | Do. |

NOTE 1.—This represents the intermediate that had been water precipitated and centrifuged and had a moisture content of about 45% by weight.

ᵃ Control that was made with dry intermediate and 600 mls. of n-butyl alcohol.
ᵇ Dry intermediate was used resulting in greater degree of reaction; the carboxyl content was below a usable level.

By reference to the above Table II, it will be seen that the carboxyl content decreases as the proportion of n-butanol employed increases. Also, that the adherence and dye stain are best for Examples 11–17. It will be noted further that in Example 10 wherein no alcohol was employed, but just glycolic acid, that the values for adherence and dye stain are not as good, while in Example 18 the removability is unsatisfactory.

The coated materials and films of the invention, as previously indicated, can be prepared by coating the resin products illustrated by the preceding examples from solutions thereof in suitable organic solvents e.g. in dioxane or suitable mixtures thereof with methanol, ethanol, butanol, etc., in ketones such as acetone, in halogen containing solvents such as ethylene chloride, in alkyl ethers of ethylene glycol such as methyl cellosolve, and the like, preferably in appropriate combinations thereof and with some water included in certain formulas. Where the resin product is employed as an antihalation backing layer on a light-sensitive photographic film or plate, a suitable dye such as is known to be efficacious in backing layers or a pigment such as carbon black can advantageously be incorporated directly into the backing composition prior to coating or applied from a separate coating composition over the backing layer.

Suitable compositions for preparing the removable antihalation backings for light-sensitive photographic films of the invention are illustrated in the following example.

EXAMPLE 19

An antihalation backing composition having the weight formula:

| | Percent |
|---|---|
| Butyl carboxylalkyl resinic lactone of Example 4 | 3.5 |
| Acetone | 35.0 |
| Ethylene chloride | 40.0 |
| Methanol | 21.5 | was applied to a cellulose acetate film support. Over this layer was applied a solution of a suitable dye, for example, of the fugitive-type in a concentration of 0.5–2.0% by weight in methanol or in mixtures thereof with other alcohols such as ethanol, propanol, etc. wherein the methanol constitutes at least 50% by weight of the dye solution. A light-sensitive silver halide emulsion layer was then coated on the opposite previously subbed surface of the film support. On exposure and development the backing was completely removed.

Typical dyes useful in the above formula are fugitive dyes such as Acid Magenta (800), Acid Green (764), Acid Blue 3R (sulfonated triphenyl methane dye) and sulfonated Malachite Green (Muehler, U.S. Patent 2,150,695, issued March 14, 1939). The numbers following the names of the dyes refer to the Schultz Dyestuff Tables, 7th edition, 1931. These dyes are fugitive dyes of the acid type and are bleachable in photographic processing. Additional useful dyes include those mentioned as antihalation materials in F. P. Alles, U.S. Patent No. 2,448,507, issued September 7, 1948. Since the entire antihalation layer is removable, the dyes in some instances may be used in the form of very fine subdivision in the resinic lactone backing layer. Various synthetic and natural occurring pigments can also be employed.

In place of the cellulose acetate film support, there may be substituted other transparent and flexible support materials that are hydrophobic in nature such as film supports of cellulose nitrate, cellulose propionate, cellulose butyrate, cellulose acetatebutyrate, cellulose ether, polystyrene, polyethylene terphthalate, polyamides of the nylon type, polyvinyl chloride, and the like.

Although the invention has been described in considerable detail with reference to certain preferred embodiments thereof variations and modifications can be effected without departing from the spirit and scope of the invention as described hereinabove and as defined in the appended claims.

I claim:

1. A photographic element comprising a transparent, flexible support having at least one light-sensitive layer on one side and a non-sensitive backing layer on the other side comprising a resinous mixed ester-lactone containing —COOC$_n$H$_{2n}$COOH groups, —COOC$_n$H$_{2n}$COOR groups, —COOH groups and —COOR groups attached directly to the carbon chain of the said lactone, wherein $n$ and R of said groups are as defined below and wherein the total free carboxyl groups present are equivalent to from 4.0–6.0 mls. of N NaOH/gram of the said lactone, which is the product obtained by heating to at least 60° C. in the presence of a mineral acid, a mixture comprising (1) from 15–30% by weight of an interpolymer of a vinyl organic acid ester and an unsaturated α,β-dicarboxylic acid compound from the group consisting of maleic acid, citraconic acid, dimethylmaleic acid and anhydrides and alkyl esters of 1–4 carbon atoms thereof, fumaric acid, mesaconic acid, dimethylfumaric acid and alkyl esters of 1–4 carbon atoms thereof, (2) from 35–65% by weight of a monohydric hydroxy acid of the formula $$C_nH_{2n}(OH)(COOH)_x$$

wherein $n$ is an integer of from 1–5 and $x$ is an integer of from 1–2 and (3) from 10–45% by weight of an alkanol of the formula R—OH wherein R represents a member from the group consisting of an alkyl group of from 1–12 carbon atoms, a phenylalkyl group wherein the said alkyl group contains from 1–4 carbon atoms and a tolylalkyl group wherein the said alkyl group contains from 1–4 carbon atoms.

2. The photographic element of claim 1 wherein the said transparent support is cellulose acetate, wherein the said light-sensitive layer is a gelatino-silver halide emulsion layer, and wherein the said resinous mixed ester lactone is the product obtained by heating to at least 60° C. in the presence of sulfuric acid, a mixture comprising (1) from 15–30% by weight of a vinyl acetate-maleic anhydride interpolymer, (2) from 35–65% by weight of glycolic acid and (3) from 10–45% by weight of n-butanol.

No references cited.